(12) United States Patent  
Starner et al.

(10) Patent No.: US 8,701,050 B1
(45) Date of Patent: Apr. 15, 2014

(54) GESTURE COMPLETION PATH DISPLAY FOR GESTURE-BASED KEYBOARDS

(71) Applicant: Google Inc., Mountain View, CA (US)

(72) Inventors: Thad Eugene Starner, Mountain View, CA (US); Nirmal Patel, Mountain View, CA (US); Shumin Zhai, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/791,418

(22) Filed: Mar. 8, 2013

(51) Int. Cl.
*G06F 3/033* (2013.01)
*G06F 3/01* (2006.01)

(52) U.S. Cl.
USPC ........... 715/863; 715/773; 715/856; 715/857; 715/858; 715/860; 715/862

(58) Field of Classification Search
USPC .......... 715/773, 856, 857, 858, 860, 862, 863
See application file for complete search history.

(56) References Cited

U.S. PATENT DOCUMENTS

| | | | |
|---|---|---|---|
| 6,292,179 B1 | 9/2001 | Lee | |
| 6,801,190 B1 | 10/2004 | Robinson et al. | |
| 7,030,863 B2 | 4/2006 | Longe et al. | |
| 7,042,443 B2 | 5/2006 | Woodard et al. | |
| 7,088,345 B2 | 8/2006 | Robinson et al. | |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,382,358 B2 * | 6/2008 | Kushler et al. | 345/168 |
| 7,453,439 B1 * | 11/2008 | Kushler et al. | 345/168 |
| 7,487,461 B2 * | 2/2009 | Zhai et al. | 715/773 |
| 7,508,324 B2 | 3/2009 | Suraqui | |
| 7,706,616 B2 | 4/2010 | Kristensson et al. | |
| 7,716,579 B2 | 5/2010 | Gunn et al. | |
| 7,921,361 B2 | 4/2011 | Gunn et al. | |
| 8,036,878 B2 | 10/2011 | Assadollahi | |
| 8,059,101 B2 * | 11/2011 | Westerman et al. | 345/173 |
| 8,135,582 B2 | 3/2012 | Suraqui | |
| 2006/0119582 A1 | 6/2006 | Ng et al. | |
| 2006/0176283 A1 | 8/2006 | Suraqui | |

(Continued)

OTHER PUBLICATIONS

U.S. Appl. No. 60/430,338, by Daniel Suraqui, filed Nov. 29, 2002.

(Continued)

*Primary Examiner* — Nicholas Augustine
(74) *Attorney, Agent, or Firm* — Shumaker & Sieffert, P.A.

(57) ABSTRACT

A computing device can be configured to receive an indication of a first input gesture, a first portion of the first input gesture indicating a first character key of a plurality of character keys of a graphical keyboard and a second portion of the first input gesture indicating a second character key of the plurality of character keys. The computing device also can be configured to determine, based at least in part on the first character key and the second character key, a candidate word. The computing device can be configured to output, for display at a region of a display device at which the graphical keyboard is displayed, a gesture completion path extending from the second character key. Further, the computing device can be configured to select, in response to receiving an indication of a second input gesture substantially traversing the gesture completion path, the candidate word.

20 Claims, 7 Drawing Sheets

(56) References Cited

U.S. PATENT DOCUMENTS

| | | | |
|---|---|---|---|
| 2007/0040813 A1* | 2/2007 | Kushler et al. | 345/173 |
| 2008/0316183 A1 | 12/2008 | Westerman et al. | |
| 2011/0205160 A1* | 8/2011 | Song et al. | 345/168 |
| 2012/0036469 A1 | 2/2012 | Suraqui | |
| 2012/0223889 A1* | 9/2012 | Medlock et al. | 345/168 |

OTHER PUBLICATIONS

U.S. Appl. No. 60/505,724, by Daniel Suraqui, filed Sep. 22, 2003.

Bau et al., "OctoPocus: A Dynamic Guide for Learning Gesture-Based Command Sets", Proceedings of the 21st annual ACM symposium on User interface software and technology, Oct. 2008, pp. 37-46.

Brogan, "BlackBerry 10 arrives, why should we be getting excited?" May 1, 2012. Pocket-lint, [online]. Retrieved from the Internet: <http://www.pocket-lint.com/news/115305-blackberry-10-arrives-why-get-excited> 6 pps.

Kristensson et al., "SHARK2: A Large Vocabulary Shorthand Writing System for Pen-based Computers", Proceedings of the 17th annual ACM symposium on User interface software and technology, Oct. 2004, pp. 43-52.

* cited by examiner

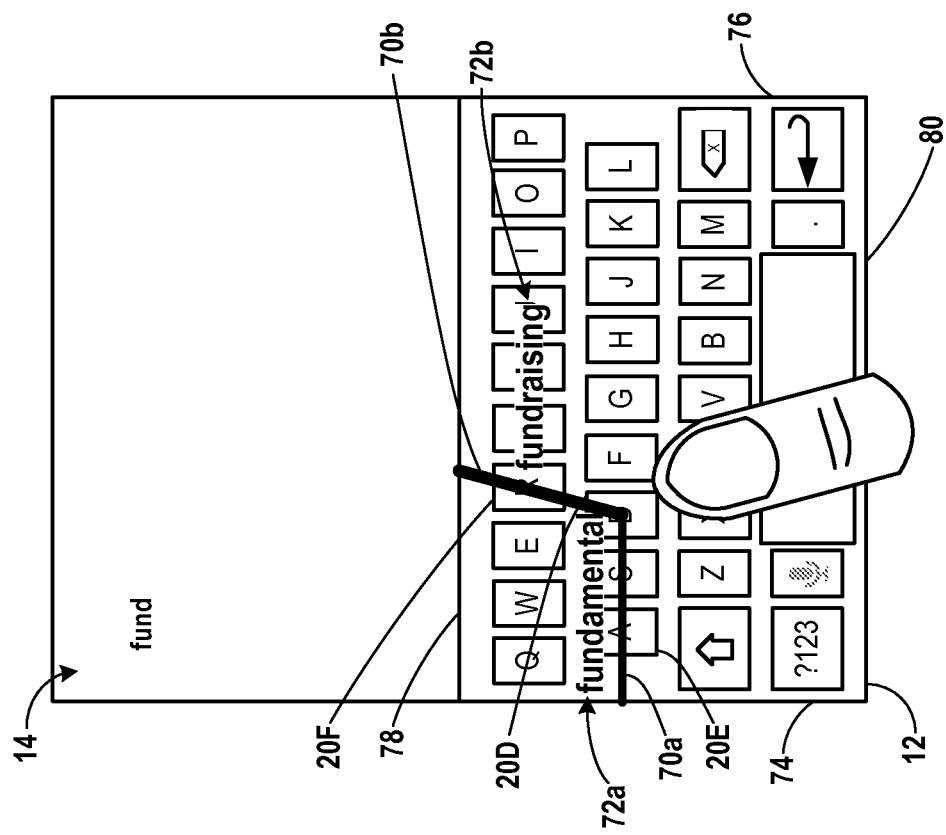
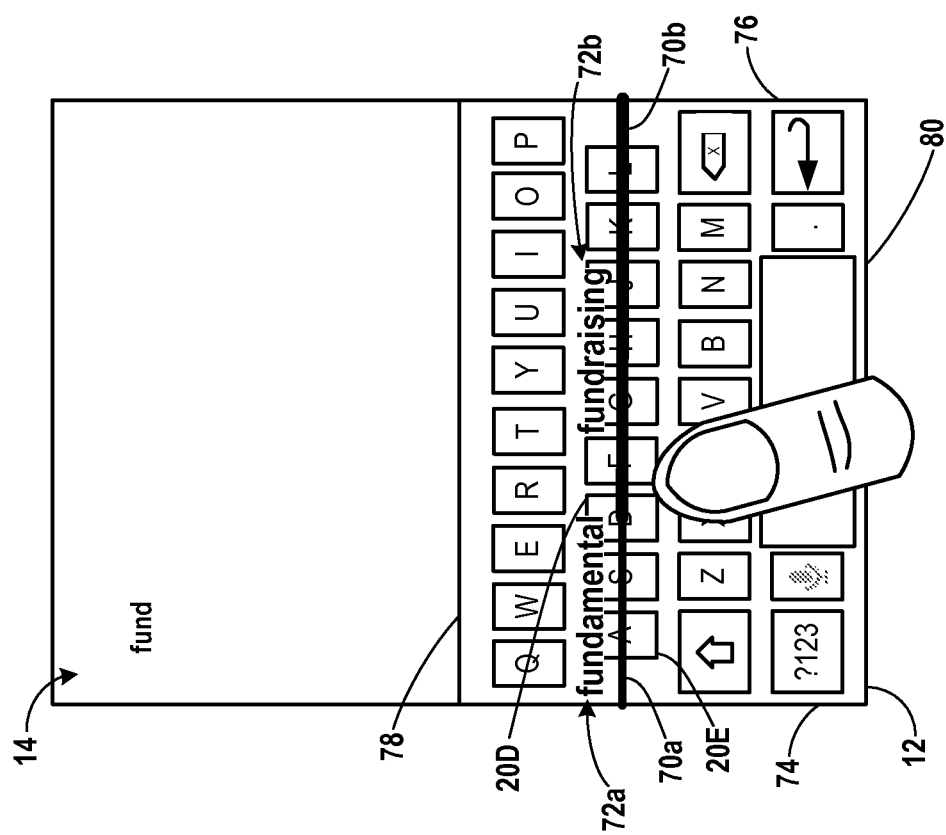
FIG. 4A
FIG. 4B

GESTURE COMPLETION PATH DISPLAY FOR GESTURE-BASED KEYBOARDS

BACKGROUND

Some computing devices (e.g., mobile phones, tablet computers, etc.) may provide a graphical keyboard as part of a graphical user interface for composing text (e.g., using a presence-sensitive input device and/or display, such as a touchscreen). The graphical keyboard may enable a user of the computing device to enter text (e.g., an e-mail, a text message, or a document, etc.). For instance, a presence-sensitive display of a computing device may output a graphical (or "soft") keyboard that enables the user to enter data by indicating (e.g., by tapping) keys displayed at the presence-sensitive display.

In some cases, the computing device may present a continuous-gesture graphical keyboard (sometimes referred to as a "gesture keyboard" or "combo gesture keyboard") with which a user can interact by sliding his or her finger over regions of the presence-sensitive display that are associated with keys of the graphical keyboard, thereby essentially gesturing a word to be input to the computing device. In other words, the user may input an entire word in a single gesture by tracing over the letters of the word output at a presence-sensitive display. In this way, continuous-gesture graphical keyboards provide an input method that allows the user to enter a word or group of words with a gesture. As such, a continuous-gesture graphical keyboard may allow the user to achieve a certain degree of efficiency, especially compared to one-handed tapping of a presence-sensitive screen (e.g., a presence-sensitive screen operatively coupled to or integrated with a computing device).

However, some continuous-gesture graphical keyboards have certain drawbacks. For example, when a user performs a gesture on a presence-sensitive display to input a longer word or phrase, the amount of time needed to select the corresponding keys of the graphical keyboard may increase. In certain examples, this results in a corresponding increase in the probability that the user may perform an input error. Moreover, in practice it may be difficult for a user to both select the next letter in the word/phrase and contemporaneously determine whether to select from among a list of predicted words output for display at the computing device. Thus, various drawbacks of gesture keyboards may reduce the speed at which a user may enter text into a computing device therewith.

SUMMARY

In one aspect, the disclosure describes a method that includes outputting, by a computing device and for display at a display device, a graphical keyboard comprising a plurality of character keys. The method can also include receiving, at the computing device, an indication of a first input gesture, a first portion of the first input gesture indicating a first character key of the plurality of character keys and a second portion of the first input gesture indicating a second character key of the plurality of character keys. In accordance with this aspect of the disclosure, the method also can include determining, by the computing device and based at least in part on the first character key and the second character key, a candidate word. The method can additionally include outputting, by the computing device and for display at a region of the display device displaying at which the graphical keyboard is displayed, a gesture completion path extending from the second character key. Further, the method can include selecting, by the computing device and in response to receiving an indication of a second input gesture that substantially traverses the gesture completion path, the candidate word.

In another aspect, the disclosure describes a computing device that includes a display device, one or more processors, a user interface module operably by the one or more processors and configured to output, for display at the display device, a graphical keyboard comprising a plurality of character keys, and a gesture module. In accordance with this aspect of the disclosure, the gesture module is operable by the one or more processors and configured to receive an indication of a first input gesture, a first portion of the first input gesture indicating a first character key of the plurality of character keys and a second portion of the first input gesture indicating a second character key of the plurality of character keys. The gesture module also can be configured to determine, based at least in part on the first character key and the second character key, a candidate word. Additionally, the gesture module can be configured to output, for display by the user interface module at a region of the display device at which the graphical keyboard is displayed, a gesture completion path extending from the second character key. The gesture module can further be configured to output, for display by the user interface module at the region of the display device at which the graphical keyboard is displayed and adjacent to the gesture completion path, the candidate word, and select, in response to receiving an indication of a second input gesture substantially traversing the gesture completion path, the candidate word.

In a further aspect, the disclosure describes a computer-readable storage medium comprising instructions. The instructions, when executed, configure one or more processors of a computing device to output, for display at a display device, a graphical keyboard comprising a plurality of character keys. The instructions, when executed, can also configure the one or more processors of the computing device to receive an indication of a first input gesture, a first portion of the first input gesture indicating a first character key of the plurality of character keys and a second portion of the first input gesture indicating a second character key of the plurality of character keys. The instructions, when executed, can further configure the one or more processors of the computing device to determine, based at least in part on the first character key and the second character key, a candidate word. Additionally, the instructions, when executed, can further configure the one or more processors of the computing device to output, for display by the user interface module at a region of the display device at which the graphical keyboard is displayed, a gesture completion path extending from the second character key toward a third character key corresponding to a predicted next letter in the candidate word. The instructions, when executed, can also configure the one or more processors of the computing device to select, in response to receiving an indication of a second input gesture substantially traversing the gesture completion path, the candidate word.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A and 4B are conceptual diagrams illustrating example user interfaces including a graphical keyboard and multiple gesture completion paths, in accordance with one or more techniques of the present disclosure.

DETAILED DESCRIPTION

Figure 1:
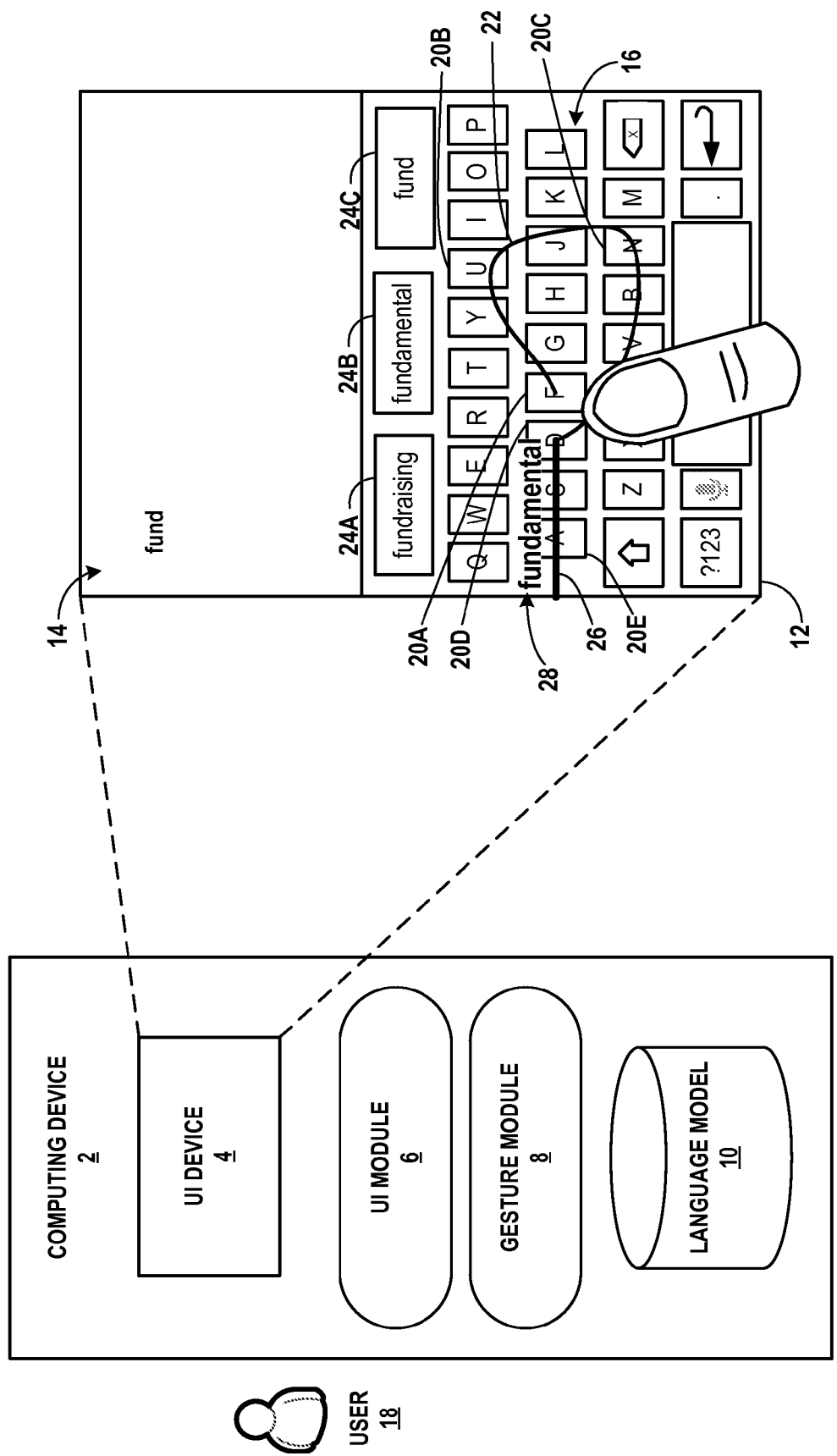
FIG. 1 is a block diagram illustrating an example computing device that may be used to display a gesture completion path for selecting a candidate word, in accordance with one or more techniques of the present disclosure.

The disclosure describes systems and techniques for displaying a visual depiction of a gesture completion path that allows a user to select a candidate word (also referred to as a predicted word or a suggested word) by performing a gesture that substantially traverses (e.g., traverses or nearly traverses) the gesture completion path. In some computing devices that employ gesture keyboards, the computing device is configured to display candidate words at a region adjacent to (e.g., above) a region of the display at which the gesture keyboard is shown. Because the dimensions of many gesture keyboards are larger than the typical perceptible human visual arc, users can often overlook the word suggestions or candidate words. Additionally, even if the user perceives a candidate word and wishes to select it, the user must stop the gesture he or she is performing and move the input unit (e.g., the user's finger, a stylus, etc.) to the region of the presence-sensitive display at which the desired candidate is displayed. In both cases (failing to notice the candidate words or having to move the input unit to the region of the display at which the candidate word is displayed), this may result in reduced rates of text entry.

In accordance with one or more aspects of the disclosure, a computing device is configured to output, for display at a region of the display device at which the gesture keyboard is displayed, a gesture completion path. The gesture completion path can be, for example, a visual representation of a path for a gesture that, when substantially performed (e.g., performed or nearly performed) by the user, causes the computing device to select a candidate word associated with the gesture completion path. In response to receiving an indication of a gesture that substantially traverses the gesture completion path, the computing device can select a candidate word associated with the gesture completion path. This may increase a likelihood that the user will perceive the gesture completion path. Additionally, if the gesture completion path is associated with a candidate word that the user intends to enter, the user may be more likely to traverse the gesture completion path to select the candidate word (e.g., compared to displaying a candidate word at a region of the display next to the graphical keyboard).

In some examples, the computing device may also be configured to output a candidate word for display at a region of the display device adjacent to the gesture completion path. By outputting the candidate word for display next to the gesture completion path, the computing device may increase a likelihood that the user of the device will perceive the candidate word.

Additionally, in some examples, the computing device may output the gesture completion path for display at a location extending from the character key that the device determines to be the most recently indicated character key. Because the computing device outputs the gesture completion path for display at this location (e.g., as opposed to another location of the gesture keyboard or adjacent to the gesture keyboard), the user may be more likely to perceive the gesture completion path. In some examples, the user may be able to more quickly substantially traverse the gesture completion path, as the gesture completion path may be near a location of the display at which the user has the input unit positioned. In these ways, the gesture completion path may increase the efficiency with which the user provides text input to the computing device.

FIG. 1 is a block diagram illustrating an example computing device 2 that may be used to present a visual depiction of a gesture completion path for selecting a candidate word, in accordance with one or more techniques of the present disclosure. In some examples, computing device 2 may be associated with user 18. A user associated with computing device 2 may interact with computing device 2 by providing various user inputs into the computing device 2.

Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc. As shown in the example of FIG. 1, computing device 2 may be a tablet computer. In some examples, computing device 2 can include user interface (UI) device 4, UI module 6, gesture module 8, and language model 10. Other examples of computing device 2 that implement techniques of this disclosure may include additional components not shown in FIG. 1.

Computing device 2 can include at least one UI device 4. In some examples, UI device 4 is configured to receive tactile, audio, or visual input. In addition to receiving input from user 18, UI device 4 can be configured to output content such as a graphical user interface (GUI) 12 for display. In the example of FIG. 1, UI device 4 can include a presence-sensitive display that displays GUI 12 and receives input from user 18 using capacitive, inductive, and/or optical detection at or near the presence sensitive display.

As shown in FIG. 1, computing device 2 may include UI module 6. UI module 6 can perform one or more functions to receive input, such as user input, and send such input to other components associated with computing device 2, such as gesture module 8. For example, UI module 6 may determine a gesture performed by user 18 at UI device 4. UI module 6 may also receive data from components associated with computing device 2, such as gesture module 8. Using the data, UI module 6 may cause other components associated with computing device 2, such as UI device 4, to provide output based on the data. For instance, UI module 6 may receive data from gesture module 8 that causes UI device 4 to display information in text entry field 14 and/or graphical keyboard 16 of GUI 12.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes gesture module 8. Gesture module 8 may include functionality to perform any variety of operations on computing device 2. For instance, gesture module 8 may include functionality to output for display at UI device 4 a gesture completion path for selecting a candidate word in accordance with the techniques described herein. Gesture module 8 may be implemented in various ways. For example, gesture module 8 may be implemented as a downloadable or pre-installed application or "app." In other examples, gesture module 8 may be implemented as part of a hardware unit of computing device 2 or as part of an operating system of computing device 2.

Gesture module 8 may receive data from components associated with computing device 2, such as UI module 6. For instance, gesture module 8 may receive gesture data from UI module 6 that causes gesture module 8 to determine a candidate word from the gesture data and output a gesture completion path for display at UI device 4. Gesture module 8 may also send data to components associated with computing device 2, such as UI module 6. For instance, gesture module 8 may send a candidate word determined from the gesture data or a gesture completion path for selecting the candidate word to UI module 6 that causes UI device 4 to display GUI 12.

As shown in FIG. 1, GUI 12 may be a user interface generated by UI module 6 that allows user 18 to interact with computing device 2. GUI 12 may include graphical content. Graphical content, generally, may include text, images, a group of moving images, etc. In FIG. 1, graphical content can include graphical keyboard 16, text entry area 14, and word suggestion areas 24A-C (collectively "word suggestion areas 24"). Graphical keyboard 16 may include a plurality of character keys 20, such as "F" key 20A, "U" key 20B, "N" key 20C, "D" key 20D, and "A" key 20E. In some examples, each of the plurality of character keys 20 included in graphical keyboard 16 represents a single character. In other examples, one or more of the plurality of character keys 20 included in graphical keyboard 16 represents a group of characters selected based on a plurality of modes.

In some examples, text entry area 14 may include characters or other graphical content that are included in, for example, a text-message, a document, an e-mail message, a web browser, or any other application or object where text entry is desired. For instance, text entry area 14 may include characters or other graphical content that are selected by user 18 via gestures performed at UI device 4.

Figure 3B:
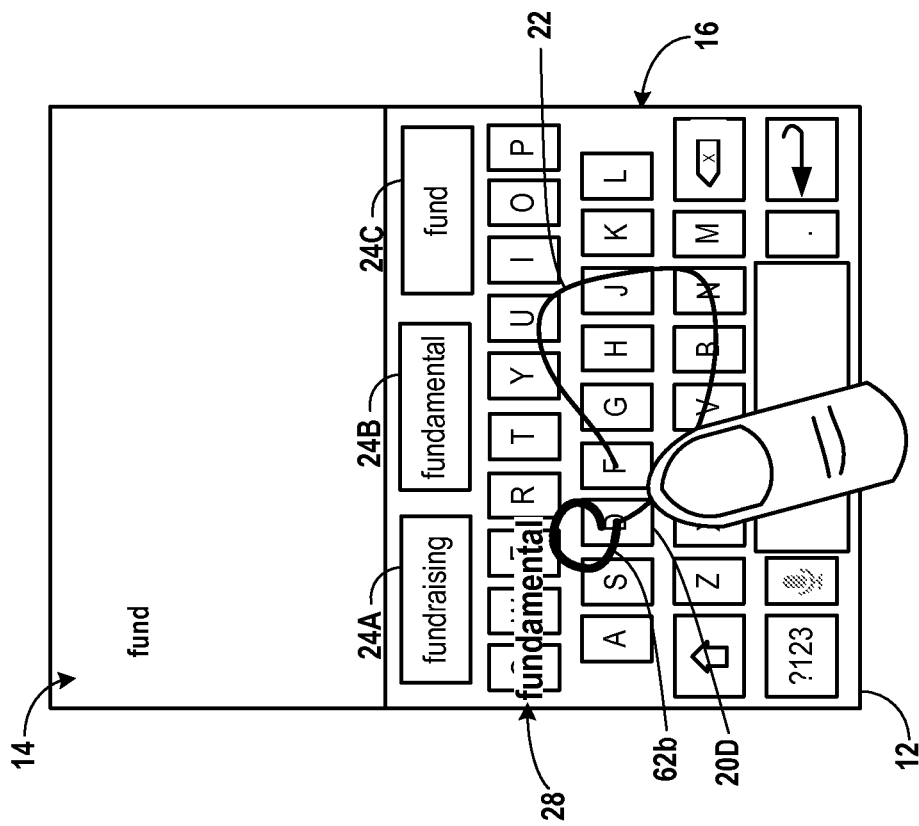
FIGS. 3A-3D are conceptual diagrams illustrating example user interfaces including a graphical keyboard and visual representations of gesture completion paths, in accordance with one or more techniques of the present disclosure.
Figure 3A:
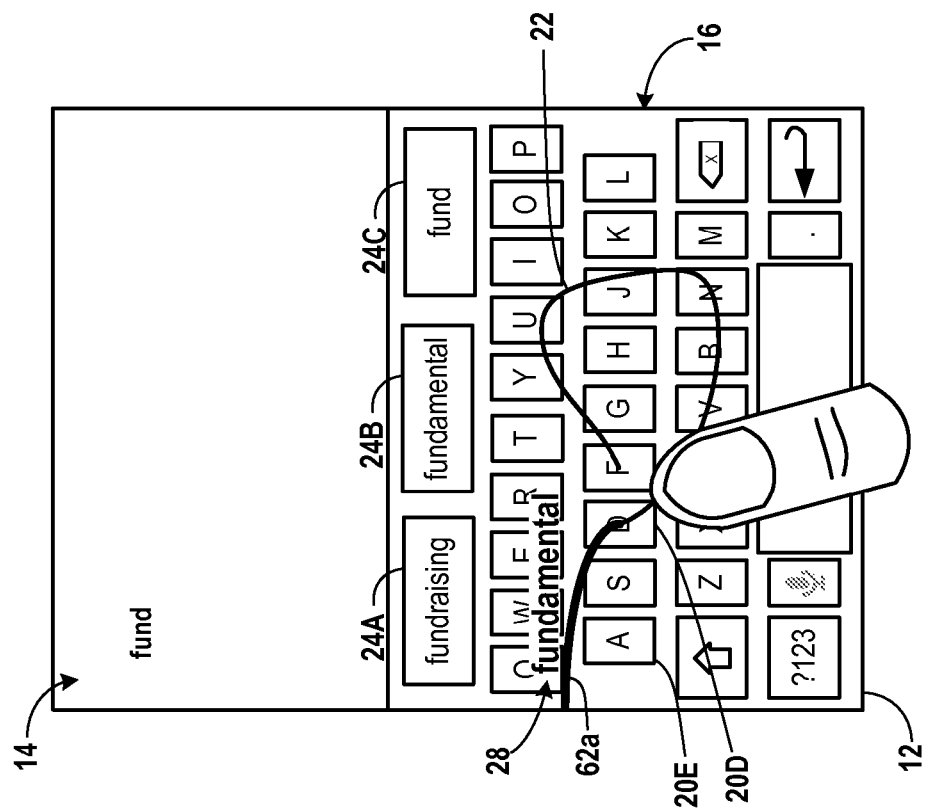

In some examples, word suggestion areas 24 may each display a candidate word. UI module 6 may cause UI device 4 to display graphical keyboard 16 and detect a gesture having gesture path 22 which, in some examples, may be incrementally determined by gesture module 8. Additionally, UI module 6 may cause UI device 4 to display a candidate word determined from the gesture in word suggestion areas 24 and display overlaying graphical keyboard 16 a gesture completion path 26 for selecting the candidate word, in accordance with aspects of this disclosure. In other examples, for example, as shown in FIG. 3A, GUI 12 may not include word suggestion areas 24, and, instead, may display candidate words at a different region of GUI 12, such as adjacent to gesture completion path 26, e.g., overlaying a portion of graphical keyboard 16.

Computing device 2, in some examples, includes language model 10. Language model 10 may include a lexicon. In some examples, a lexicon may include a listing of words and may include additional information about the listed words. A lexicon may be represented by a range of data structures, such as an array, a list, and/or a tree. For example, language model 10 may include a lexicon stored in a trie data structure. A lexicon trie data structure may contain a plurality of nodes, each node may represent a letter. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 10 may be a default dictionary installed on computing device 2. In other examples, language model 10 may include multiple sources of lexicons, which may be stored at computing device 2 or stored at one or more remote computing devices and are accessible to computing device 2 via one or more communication channels.

In some examples, language model 10 may be implemented in the firmware of computing device 2. Language model 10 may include language model frequency information such as n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "w" follows the sequence "no". In some examples, language model 10 includes a lexicon trie with integrated language model frequency information. For instance, each node of the lexicon trie may include a representation of a letter and a probability value.

As shown in FIG. 1, instead of performing a discrete gesture (e.g., tap) for each character key of a word, user 18 can perform a single, continuous gesture (indicated by gesture path 22) that indicates a portion of the word, and then substantially traverse (e.g., traverse or nearly traverse) a gesture completion path 26 for indicating a candidate word (e.g., one of the words displayed at word suggestion areas 24) determined by gesture module 8 using language model 10. As user 18 performs the gesture substantially along gesture path 22, computing device 2 may incrementally determine the word indicated by gesture path 22. By incrementally decoding gesture path 22 as it is being performed, computing device 2 presents one or more candidate words to user 18 with reduced post-gesture entry processing time. Moreover, by enabling user 18 to enter a word or phrase with a single gesture (including gesture 22 and a gesture that substantially traverses gesture completion path 26), techniques of this disclosure enable user 18 to increase the rate at which text is entered at device 2.

As shown in the example of FIG. 1, UI module 6 may cause UI device 4 to display GUI 12. User 18 may desire to enter text, for example the word "fundamental" into text entry area 14. User 18, in accordance with the techniques of this disclosure, may perform a gesture indicated by gesture 22 at graphical keyboard 16. In one example, the gesture may be a continuous motion in which the finger of user 18 (or another input unit, such as a stylus) moves into proximity with UI device 4 such that the gesture performed by the finger is detected by UI device 4 throughout the performance of gesture path 22. In a different example, user 18 may, move his/her finger into proximity with UI device 4 such that the finger is temporarily detected by UI device 4 and then the finger of user 18 moves away from UI device 4 such that the finger is no longer detected. Gesture path 22 may include a plurality of portions. In some examples, gesture path 22 may be divided into portions with substantially equivalent time durations.

While user 18 performs the gesture indicated by gesture path 22 to indicate a sequence of character keys of the plurality of character keys 20, UI module 6 may detect gesture path 22 at the presence-sensitive display. As shown in FIG. 1, user 18 performs the gesture by tracing a gesture path 22 through or near character keys of graphical keyboard 16 that correspond to the characters of the desired word (i.e., the characters represented by "F" key 20A, "U" key 20B, "N" key 20C, "D" key 20D, and "A" key 20E). UI module 6 may send data that indicates gesture path 22 to gesture module 8. In some examples, UI module 6 incrementally sends data indicating gesture path 22 to gesture module 8 as the gesture is detected by UI device 4 and received by UI module 6. For instance, UI module 6 may send a stream of coordinate pairs indicating gesture path 22 to gesture module 8 as the gesture is detected by UI device 4 and received by UI module 6.

In response to receiving data that represents gesture path 22 from UI module 6, gesture module 8 may determine a candidate word. A candidate word may be a word suggested by computing device 2 to user 18 that is includes of a group of keys indicated by gesture 22 (and, in some instances, additional characters that, together with the groups of keys, form a complete word or phrase of multiple words). The group of keys may be determined based on gesture 22 and a lexicon. Gesture module 8 may determine a candidate word by determining a group of alignment points traversed by gesture 22, determining respective cost values for each of at least two keys of the plurality of character keys 20, and comparing the respective cost values for at least each of at least two keys of the plurality of character keys 20.

An alignment point is a point along gesture 22 that may indicate a key of the plurality of character keys 20. An alignment point may include one or more coordinates corresponding to the determined position of the alignment point. For instance, an alignment point may include Cartesian coordinates corresponding to a point at GUI 12.

In some examples, gesture module 8 may analyze a curvature of a segment of gesture path 22, a local speed representing a rate at which a segment of path 22 was detected, and a global speed representing a rate at which gesture path 22 was detected. If gesture module 8 determines a slower speed or pause for the local speed, gesture module 8 may determine that a point at the segment is more likely to be an alignment point. If gesture module 8 determines that a gesture was drawn quickly, the gesture module 8 may determine the gesture is more likely to be imprecise and therefore gesture module 8 may increase the weight on the language module (i.e., n-gram frequencies) than the spatial model. In one example, gesture module 8 may determine an alignment point of the group of alignment points based on a segment of gesture path 22 having a high curvature value.

In the example of FIG. 1, gesture module 8 may determine a first alignment point at the start of gesture path 22, a second alignment point at the point where gesture path 22 experiences a first significant change in curvature, a third alignment point at the point where gesture path 22 experiences a second significant change in curvature, and a fourth alignment point at the end of gesture path 22. In still other examples, techniques of the disclosure can identify a shape of gesture path 22 as a feature and determine an alignment point based on the shape of gesture path 22.

In some examples, gesture module 8 may determine respective cost values for each of at least two character keys of the plurality of character keys 20 included in keyboard 16. Each of the respective cost values may represent a probability that an alignment point indicates a key. In some examples, the respective cost values may be based on physical features of gesture path 22, the alignment point, and/or the key. For instance, the respective cost values may be based on the physical location of the alignment point with reference to the physical location of one or more of the plurality of character keys 20. In some examples, the respective cost values may be based on language model 10. For instance, the respective cost values may be based on the probability that a second key will be selected after a first key (e.g., the probability that the "U" key 20B will be selected after the "F" key 20A). In some examples, the character keys for which respective cost values are determined are selected based at least in part on language model 10. In some examples, the cost values are lower where there is a greater likelihood that an alignment point indicates a character key. In other examples, the cost values are higher where there is a greater likelihood that an alignment point indicates a key.

In the example of FIG. 1, gesture module 8 may determine a first cost value representing a probability that the first alignment point indicates "F" key 20A and a second cost value representing a probability that the first alignment point indicates another key, such as "G" key (not labeled in FIG. 1). Similarly, gesture module 8 may determine a third cost value representing a probability that the second alignment point indicates "U" key 20B and a third cost value representing a probability that the second alignment point indicates "Y" key (not labeled in FIG. 1). Gesture module 8 may determine a fifth cost value representing a probability that the third alignment point indicates "N" key 20C and a sixth cost value representing a probability that the third alignment point indicates "B" key (not labeled in FIG. 1) Finally, gesture module 8 may determine a third cost value representing a probability that the second alignment point indicates "D" key 20D and a third cost value representing a probability that the second alignment point indicates "C" key (not labeled in FIG. 1).

Gesture module 8 may compare the respective cost values for at least two keys of the plurality of character keys 20 to determine a combination of keys having a combined cost value. A combined cost value may represent a probability that gesture path 22 indicates a combination of keys. Gesture module 8 may compare the respective cost values for at least two character keys of the plurality of character keys 20 to determine which of the at least two character keys is indicated by an alignment point. Gesture module 8 may determine a combination of character keys by determining which character keys are indicated by each alignment point. In some examples, gesture module 8 determines which of the at least two character keys is indicated by an alignment point without regard to which character keys are indicated by other alignment points. In other examples, gesture module 8 determines which of the at least two keys is indicated by the alignment point based on which keys are indicated by other alignment points. In such examples, gesture module 8 may revise the determination of which character key is indicated by a previous alignment point based on the respective cost values for a current alignment point.

In some examples, gesture module 8 begins to determine a candidate word prior to the time in which UI device 4 completes detecting gesture path 22. In the example of FIG. 1, rather than determining the candidate word after UI device 4 completes detecting gesture path 22, gesture module 8 may determine a plurality of candidate words as gesture path 22 is detected, such as "fun", "funny", and "funk". Additionally, in the example of FIG. 1, gesture module 8 may contemporaneously revise the determined plurality candidate of words as gesture path 22 is detected, such as revising "fun" to "fundamental". Furthermore, rather than determining the candidate word based on a geometric shape of gesture path 22, techniques of the disclosure may determine a candidate word based on a group of characters indicated by the gesture. Gesture module 8 may send the determined word to UI module 6 which may then cause UI device 4 to display the word "fund" in text entry area 14 of GUI 12.

In accordance with one or more aspects of the disclosure, gesture module 8 output, to UI module 6 for display at UI device 4 (e.g., as part of GUI 12) a gesture completion path 26 that, when substantially traversed by an input unit, causes computing device 2 to select a candidate word (e.g., one of the words in word suggestion areas 24). In particular, UI device 4 may output gesture completion path 26 at a region of GUI 12 that is displaying graphical keyboard 16. In some implementations, as shown in FIG. 1, gesture module 8 may send data to UI device 4 that causes UI device 4 to display gesture completion path 26 as a graphical element that overlays a portion of graphical keyboard 16.

Based on data received from gesture module 8, UI module 6 may cause UI device 4 to display gesture completion path 26 at a location with the region of graphical keyboard 16 based at least in part on at least one candidate word. For example, as described above, gesture module 8 may determine at least one candidate word based on gesture path 22. The at least one candidate word may include a word that comprises additional letters beyond those indicated by gesture path 22. In this way, the at least one candidate word may be a predicted word. Gesture module 8 may output gesture completion path 26 based at least in part on the predicted word.

For example, as shown in FIG. 1, gesture module 8 has determined three candidate words displayed at word suggestion areas 24A-C ("fundraising," "fundamental," and "fund," respectively) of GUI 12. Gesture module 8 may determine, e.g., based on respective cost values of the three candidate words, that "fundamental," shown in second word suggestion area 24B, is most likely to be the word that user 18 intends to input. Additionally, gesture module 8 may determine that the last one of plurality of character keys 20 indicated by gesture path 22 is "D" key 20D. For example, gesture module 8 may determine that gesture path 22 (as detected at that time) ends at "D" key 20D. Based at least in part on these two determinations, gesture module 8 may output gesture completion path 26 to UI module 6 for display at UI device 4 at a region of GUI 12 extending from the location of the most recently indicated character key, (the "D" key 20D in FIG. 1).

In some examples, gesture module 8 may output data to UI module 6 that causes UI device 4 to display gesture completion path 26 at a region of GUI 12 extending from the location of the most recently indicated character key toward a character key corresponding to a predicted next letter in the candidate word. For example, as shown in FIG. 1, gesture completion path 26 extends from "D" key 20D toward "A" key 20E, which is the predicted next letter in candidate word "fundamental" shown in second word suggestion area 24B. In some examples, as in FIG. 1, gesture completion path 26 can extend from "D" key 20D toward a center of "A" key 20E. In other examples, as shown in FIG. 3A, gesture completion path 26 can extend from "D" key 20D toward an edge of "A" key 20E. When UI device 4 outputs gesture completion path 26 extending from the most recently indicated character key toward a character key corresponding to a predicted next letter in the candidate word, this may leverage the motion that user 18 is already making, e.g., toward the predicted next letter, to select the candidate word associated with gesture completion path 26.

In some implementations, gesture completion path 26 may not end at the predicted next letter, but may extend past the predicted next letter, e.g., to a border of graphical keyboard 16 or an edge of UI device 4. By outputting gesture completion path 26 for display at GUI 12 at a location extending past the predicted next letter, gesture module 8 may improve differentiation between an indication of a gesture performed by user 18 to indicate the predicted next letter and an indication of a gesture performed by user 18 to substantially traverse the gesture completion path 26 (and indicate the associated candidate word).

For example, in some instances when UI device 4 is sufficiently large that graphical keyboard 16 does not extend to an edge of UI device 4, gesture module 8 may output data to UI module 6 that causes UI device 4 to display gesture completion path 26 at user interface 12 at a region extending from "D" key 20D to a border of graphical keyboard 16. As another example, in some instances when graphical keyboard 16 extends to an edge of UI device 4, gesture module 8 may output data to UI module 6 that causes UI device 4 to display gesture completion path 26 at user interface 12 at a region extending from "D" key 20D to an edge of UI device 4. In some examples, the edge of UI device 4 and the border of graphical keyboard 16 may be substantially the same location. When UI device 4 outputs gesture completion path 26 extending toward to a border of graphical keyboard 16 and/or an edge of UI device 4, user 18 need not precisely control the location at which user 18 stops performing the gesture substantially traversing gesture completion path 26. For example, user 18 may perform the input unit (e.g., his or her finger or a stylus) to or past the border to complete the gesture substantially traversing gesture completion path 26. In some instances, this permitted impreciseness can increase a speed at which user 18 completes the gesture, as user 18 need only perform a ballistic (e.g., fast, less precise) movement and not a targeting (e.g., slower, more precise) movement.

Gesture module 8 can generate gesture completion path 26 for display at GUI 12 as a translucent or opaque graphical element overlaying a portion of graphical keyboard 16. For example, gesture completion path 26 can be a line with a defined width, as shown in FIG. 1. Other examples of shapes of gesture completion path 26 are shown in FIGS. 3A-3D. The gesture module 8 may select the opacity of gesture completion path 26 based at least in part on balancing the ability of user 18 to perceive gesture completion path 26 and how much gesture completion path 26 obscures underlying portions of graphical keyboard 16. In some examples, the opacity of gesture completion path 26 may be adjustable by user 18, e.g., using a settings menu for graphical keyboard 16. Additionally or alternatively, the color of gesture completion path 26 may be predefined or selected by user 18, e.g., using a setting menu displayed at GUI 12.

In some implementations, gesture module 8 also may output data to UI module 6 that causes UI device 4 to display the candidate word associated with gesture completion path 26 for display at GUI 12 adjacent to gesture completion path 26. In some examples, gesture module 8 may determine a candidate word with the highest current likelihood (e.g., lowest cost value), and may output, for display at GUI device 12 and overlying graphical keyboard 16, a gesture completion path 26 and the candidate word. For example, as shown in FIG. 1, UI device 4 outputs candidate word "fundamental" 28 for display adjacent to gesture completion path 26. "Adjacent to gesture completion path 26" can include a location overlying graphical keyboard 16 that is above, below, to a side, or otherwise near gesture completion path 26. In some examples, a location near gesture completion path 26 may be within a predetermined distance of gesture completion path 26. By generating candidate word "fundamental" 28 for display adjacent to gesture completion path 26, gesture module 8 may increase a likelihood that user 18 perceives candidate word "fundamental" 28 (e.g., compared to candidate words displayed at word suggestion areas 24), as the visual focus of user 18 is likely directed to graphical keyboard 16 near "D" key 20D as user 18 performs the portion of the gesture path 22 indicating the "D" key 20D. Although FIG. 1 illustrates candidate words displayed at word suggestion areas 24 in addition to candidate word "fundamental" 28 displayed adjacent to gesture completion path 26, in other examples, e.g., as shown in FIGS. 4A and 4B, UI module 6 may not display word suggestion areas 24.

FIG. 1 illustrates an example in which gesture module 8 generates both gesture path 22 and gesture completion path 26 and sends them to UI module 6, which causes UI device 4 to display gesture path 22 and gesture completion path 26 at GUI 12. In some examples, the visual depiction of gesture path 22 may be different than the visual depiction of gesture completion path 26. For example, the visual depictions may be different colors, opacities, thicknesses, etc. In some implementations, gesture module 8 can output data to UI module 6 that causes UI device 4 to display a visual depiction of a portion of gesture path 22. For example, UI device 4 can output only a more recently indicated portion of gesture path 22 for display at GUI 12, and can cause a less recent portion of gesture path 22 to not be output for display at GUI 12, such as by causing the less recent portion of gesture path 22 to appear to fade away. In other examples, gesture module 8 may not generate a visual depiction of all or a portion of gesture path 22 for display at GUI 12.

Hence, in some examples, gesture module 8 can facilitate text entry by user 18. Gesture module 8 may generate gesture completion path 26 (and, optionally a candidate word) for display by UI device 4 in a manner and location of GUI 12 that increases a likelihood that user 18 perceives gesture completion path 26. When gesture completion path 26 is associated with a candidate word that user 18 intends to input, user 18 can select the candidate word by performing a gesture that substantially traverses gesture completion path 26 and thereby select the candidate word. Because gesture completion path 26 extends from a location of graphical keyboard 16 near an end of the currently indicated portion of gesture path 22 (e.g., a recently indicated one of character keys 20), gesture completion path 26 may be conveniently substantially traversed by user 18 by performing a gesture that extends from the gesture the user 18 made to indicate gesture path 22. In this way, gesture completion path 26 can facilitate text entry to computing device 2 by user 18.

Figure 2:
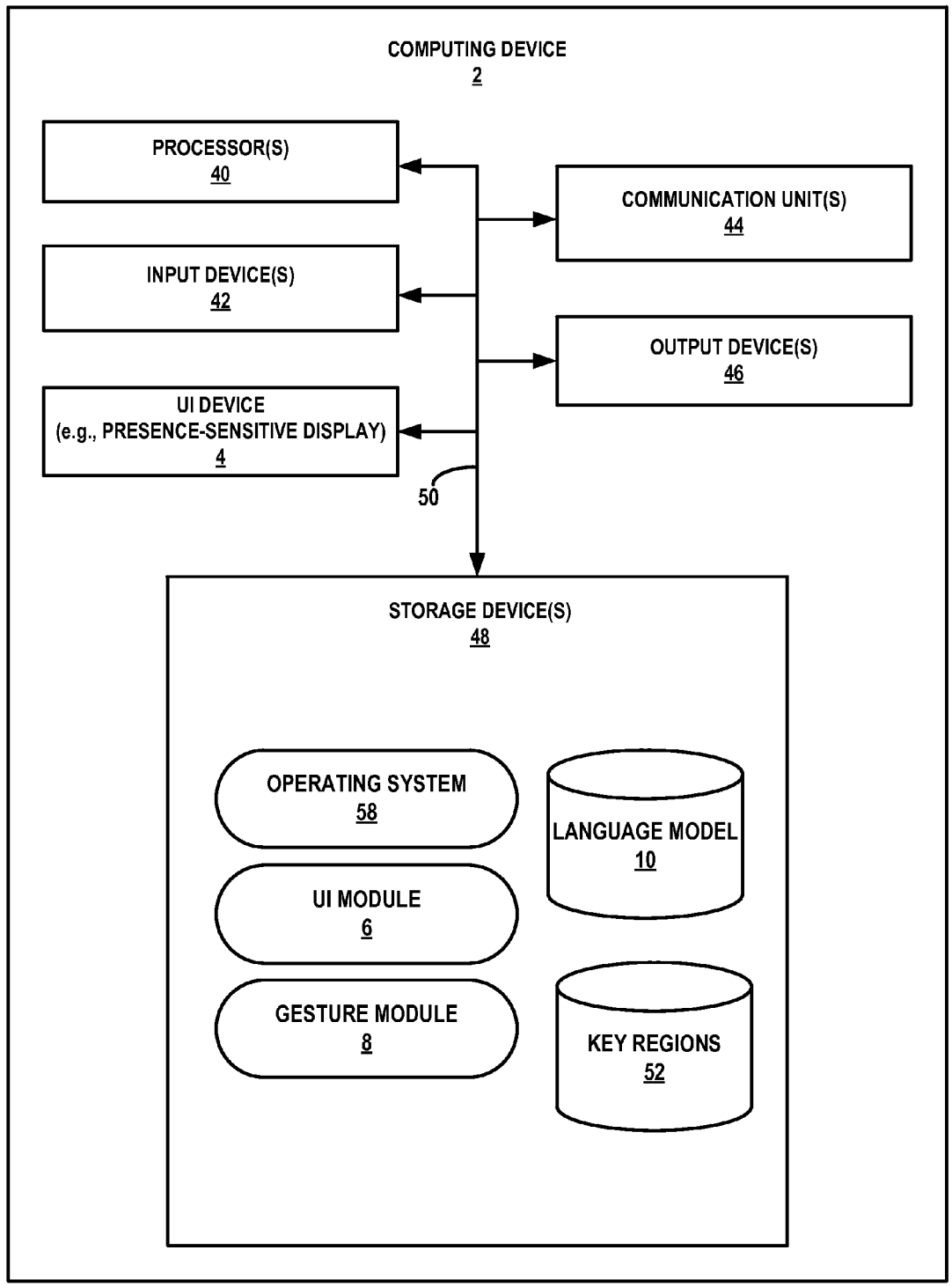
FIG. 2 is a block diagram illustrating further details of one example of a computing device as shown in FIG. 1, in accordance with one or more techniques of the present disclosure.

FIG. 2 is a block diagram illustrating further details of one example of a computing device shown in FIG. 1, in accordance with one or more techniques of the present disclosure. FIG. 2 illustrates only one particular example of computing device 2 as shown in FIG. 1, and many other examples of computing device 2 may be used in other instances.

As shown in the example of FIG. 2, computing device 2 includes one or more processors 40, one or more input devices 42, one or more communication units 44, one or more output devices 46, one or more storage devices 48, and user interface (UI) device 4. In the example of FIG. 2, computing device 2, further includes UI module 6, gesture module 8, word prediction module 50, and operating system 58, which are executable by one or more processors 40. Computing device 2 further includes language model 10 and key regions 52. Each of components 4, 40, 42, 44, 46, and 48 are coupled (physically, communicatively, and/or operatively) using communication channels 50 for inter-component communications. In some examples, communication channels 50 may include a system bus, a network connection, an inter-process communication data structure, or any other method for communicating data. UI module 6, gesture module 8, and word prediction module 50 may also communicate information with one another, as well as with other components in computing device 2, such as language model 10 and key regions 52.

One or more processors 40, in one example, are configured to implement functionality and/or process instructions for execution within computing device 2. For example, processors 40 may be capable of processing instructions stored by storage device 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when power is not provided to storage device 48. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., gesture module 8) to temporarily store information during program execution.

In some examples, storage devices 48 may further include one or more storage device 48 configured for longer-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video sources. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 2, UI device 4 may be a touch-sensitive screen.

Computing device 2 also can include UI device 4. In some examples, UI device 4 is configured to receive tactile, audio, or visual input. In addition to receiving input from user 18, UI device 4 can be configured to output content such as a graphical user interface (GUI) 12 for display. In the example of FIG. 1, UI device 4 can include a presence-sensitive display that displays GUI 12 and receives input from user 18 using capacitive, inductive, and/or optical detection at or near the presence sensitive display. In some examples, UI device 4 is both one of input devices 44 and one of output devices 46.

In some examples, UI device 4 of computing device 2 may include functionality of input devices 42 and/or output devices 46. In some examples, a presence-sensitive screen may detect an object at and/or near the presence-sensitive screen. As one example range, a presence-sensitive screen may detect an object, such as a finger or stylus, which is within two inches or less of the presence-sensitive screen. The presence-sensitive screen may determine a location (e.g., an (x,y) coordinate) of the presence-sensitive screen at which the object was detected. In another example range, a presence-sensitive screen may detect an object six inches or less from the presence-sensitive screen. Other exemplary ranges are also possible. The presence-sensitive screen may determine the location of the screen selected by a user's finger using capacitive, inductive, and/or optical recognition techniques. In some examples, presence-sensitive screen provides output to a user using tactile, audio, or video stimuli as described with respect to output device 46. In the example of FIG. 2, UI device 4 presents a user interface (such as graphical user interface 12 of FIG. 1), and other various functions and applications executing on computing device 2 at the presence-sensitive screen of UI device 4.

Computing device 2 may include operating system 58. Operating system 58, in some examples, controls the operation of components of computing device 2. For example, operating system 58, in one example, facilitates the communication of UI module 6, gesture module 8, and/or word prediction module 50 with processors 40, communication unit 44, storage device 48, input device 42, and output device 46. UI module 6 and gesture module 8 may each include program instructions and/or data that are executable by computing device 2. As one example, UI module 6 may include instructions that cause computing device 2 to perform one or more of the operations and actions described in the present disclosure.

Language model 10 may include a lexicon, which may be similar to language model 10 shown in FIG. 1. In some examples, a lexicon may include a listing of words and may include additional information about the listed words. A lexicon may be represented by a range of data structures, such as an array, a list, and/or a tree. For example, language model 10 may include a lexicon stored in a trie data structure.

Physical features of the plurality of keys may be included in key regions 52. For example, key regions 52 may include, for each of the plurality of keys, a set of coordinates that correspond to a location and/or area of graphical keyboard 16 where each key is displayed.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For example, in some configurations, computing device 2 may not include communication unit 44.

In accordance with one or more aspects of the disclosure, gesture module 8 is operable by one or more processors 40 to determine a sequence of characters indicated by a gesture path (e.g., gesture path 22 of FIG. 1) corresponding to a gesture performed by user 18. Additionally, gesture module 8 is operable by one or more processors 40 to determine candidate word based on at least two characters of the sequence of characters and output for display by UI module 6 at UI device 4 a gesture completion path (e.g., gesture completion path 26 of FIG. 1) that, when substantially traversed by a gesture performed by user 18, selects the candidate word.

Gesture module 8 receives an indication of the gesture path traced at UI device 4 (e.g., a presence-sensitive display) by the user (e.g, user 18 of FIG. 1) and determines one or more candidate words based on, for example, language model 10 and a cost values for each of a plurality of character strings, as described with respect to FIG. 1. Based on the one or more candidate words, gesture module 8 generates and outputs the gesture completion path to UI module 6 for display UI device 4. In some instances, the gesture completion path is associated with one of the one or more candidate words, such that gesture module 8 selects the associated candidate word when gesture module 8 receives an indication (e.g., from UI device 4 and/or UI module 6) that a user has performed a gesture substantially traversing the gesture completion path.

Gesture module 8 may generate the gesture completion path for display by UI module 6 at a region of UI device 4 that is displaying a graphical keyboard. FIGS. 3A-3D are example GUIs 12 output by UI module 6 for display at UI device 4, in accordance with one or more aspects of the disclosure. Example GUI 12 include a graphical keyboard 16 and a text entry field 14. The example GUIs 12 of FIGS. 3A-3D illustrate examples of different gesture completion paths that gesture module 8 may generate and output to UI module 6 for display at UI device 4. In the examples of FIGS. 3A-3D, gesture module 8 outputs the gesture completion paths for display at a location within the region of graphical keyboard 16 based at least in part on at least one candidate word.

For example, as shown in FIGS. 3A-3D, gesture module 8 has determined three candidate words displayed at word suggestion areas 24A-C ("fundraising," "fundamental," and "fund," respectively). Gesture module 8 may determine, e.g., based on respective cost values of the three candidate words, that "fundamental," shown in second word suggestion area 24B, is most likely to be the word that user 18 intends to input. Additionally, gesture module 8 may determine that the last one of plurality of character keys 20 indicated by gesture path 22 is "D" key 20D. For example, gesture module 8 may determine that gesture path 22 (as currently detected) ends at "D" key 20D. Based at least in part on these two determinations, gesture module 8 may output a gesture completion path for display at a region of UI device 4 extending from the location of the most recently indicated character key (the "D" key 20D in FIG. 1).

As shown in FIG. 3A, gesture completion path 62a can include a line that extends from "D" key 20D (the most recently indicated key) toward "A" key 20E (the next character in candidate word "fundamental"). When gesture module 8 outputs gesture completion path 62a to UI module 6 for display at UI device 4 at a location extending from the most recently indicated character key toward a character key corresponding to a predicted next letter in the candidate word, this may leverage the motion that user 18 is already making, e.g., toward the predicted next letter, to select the candidate word associated with gesture completion path 62a.

As opposed to gesture completion path 26 shown in FIG. 1, gesture completion path 62a shown in FIG. 3A does not extend toward a center of "A" key 20E. Instead, gesture completion path 62a extends toward an edge of "A" key 20E but not directly through "A" key 20E. In this way, gesture completion path 26 deviates from a path toward a center of "A" key 20E. For instance, gesture completion path 62a can extend over a peripheral portion of "A" key 20E or may extend above, below, or to a side of "A" key 20E. By outputting gesture completion path 62a to UI module 6 for display at a location of GUI 12 that does not directly overlay "A" key 20E, gesture module 8 may reduce a chance of misdetection of a gesture substantially traversing gesture completion path 62a as a gesture indicating "A" key 20E or a gesture indicating "A" key 20E as a gesture substantially traversing gesture completion path 62a. Additionally, by outputting gesture completion path 62a to UI module 6 for display at a location of GUI 12 that does not directly overlay "A" key 20E, gesture module 8 may improve visibility of character keys that gesture completion path 62a would overlie (e.g., in the example of FIG. 1).

Similar to gesture completion path 26 shown in FIG. 1, gesture module 8 can output gesture completion path 62a to UI module 6 for display at UI device 4 at a location that extends past "A" key 20E, e.g., to a border of graphical keyboard 16 or an edge of UI device 4.

In some examples, gesture completion path 62a may trace a curved line. Gesture module 8 generates the curved line to continue a curvature of gesture path 22 or to transition from a curvature gesture path 22 to a straighter path or a different curvature. This may allow the gesture that the user performs to substantially traverse gesture completion path 62a to be more natural, e.g., compared to an abrupt transition between a curved gesture path 22 and a straight gesture completion path 62a. In other examples, gesture completion path 62a may define a substantially straight line, e.g., similar to gesture completion path 26 shown in FIG. 1.

In other examples, gesture module 8 can output, to UI module 6 for display by UI device 4, a gesture completion path that does not extend to a border of graphical keyboard 16 or an edge of UI device 4. FIG. 3B is a GUI 12 that illustrates another example gesture completion path 62b, in accordance with one or more aspects of the disclosure. Similar to gesture completion paths 26 and 62a, gesture module 8 outputs gesture completion path 62b at a location of GUI 12 extending from "D" key 20D (the most recently indicated key). In the example of FIG. 3B, gesture completion path 62b traces a loop beginning and ending adjacent to "D" key 20D. For example, as shown in FIG. 3B, gesture completion path 62b traces a loop beginning and ending at locations overlying "D" key 20D.

Gesture completion path 62b extends in a clockwise direction from an end of gesture path 22. In other implementations, gesture completion path 62b can extend in a counterclockwise direction from the end of gesture path 22. For example, gesture module 8 may determine a rotational direction of gesture completion path 62b based on a shape of gesture path 22, e.g., so that the user can continue a gesture indicating gesture path 22 smoothly into a gesture that substantially traverses gesture completion path 62b. In the example of FIG. 3B, gesture completion path 62b is relatively small compared to graphical keyboard 16 (e.g., covers a relatively small portion of graphical keyboard 16). In other examples, gesture module 8 may output gesture completion path 62b to overlay a larger portion of graphical keyboard 16, e.g., as a larger loop.

In some examples, the user need not precisely trace gesture completion path 62b to indicate candidate word "fundamental" 28. For example, gesture module 8 may be configured to interpret indications received from UI device 4 (e.g., from UI device 4 via UI module 6) that indicate that the user has performed a loop (of any size or shape approximating a loop) extending from "D" key 20D or centered on "D" key 20D as a gesture substantially traversing gesture completion path 62b. This may allow the user to perform a less precise (and, potentially, quicker) gesture to substantially traverse gesture completion path 62b and indicate candidate word "fundamental" 28.

Figure 3D:
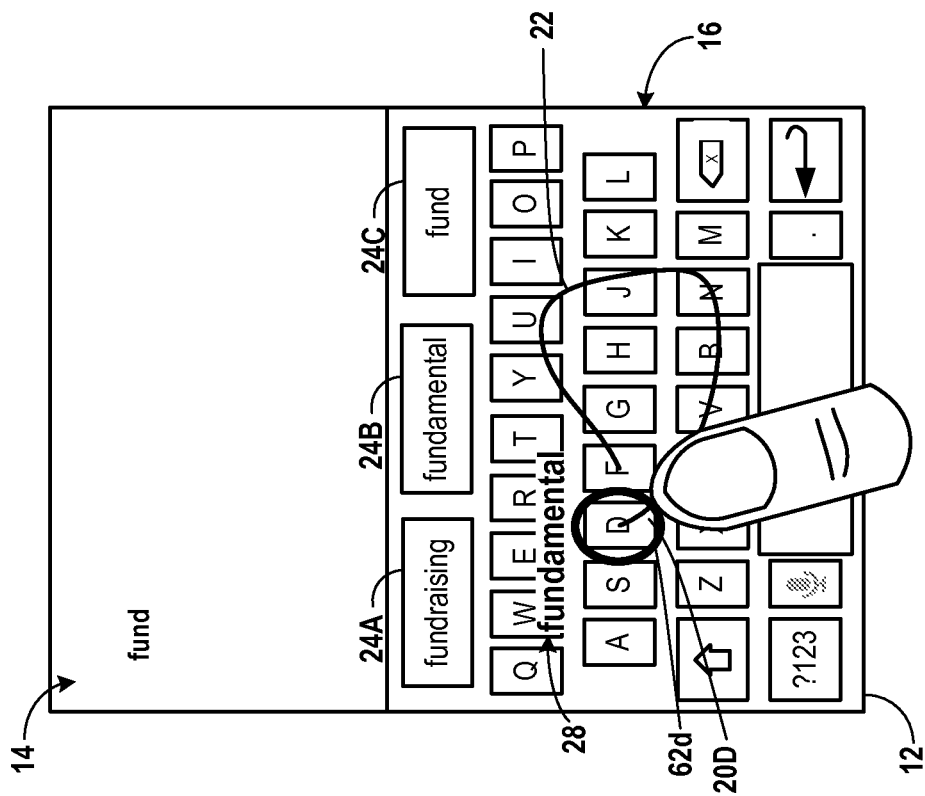
Figure 3C:
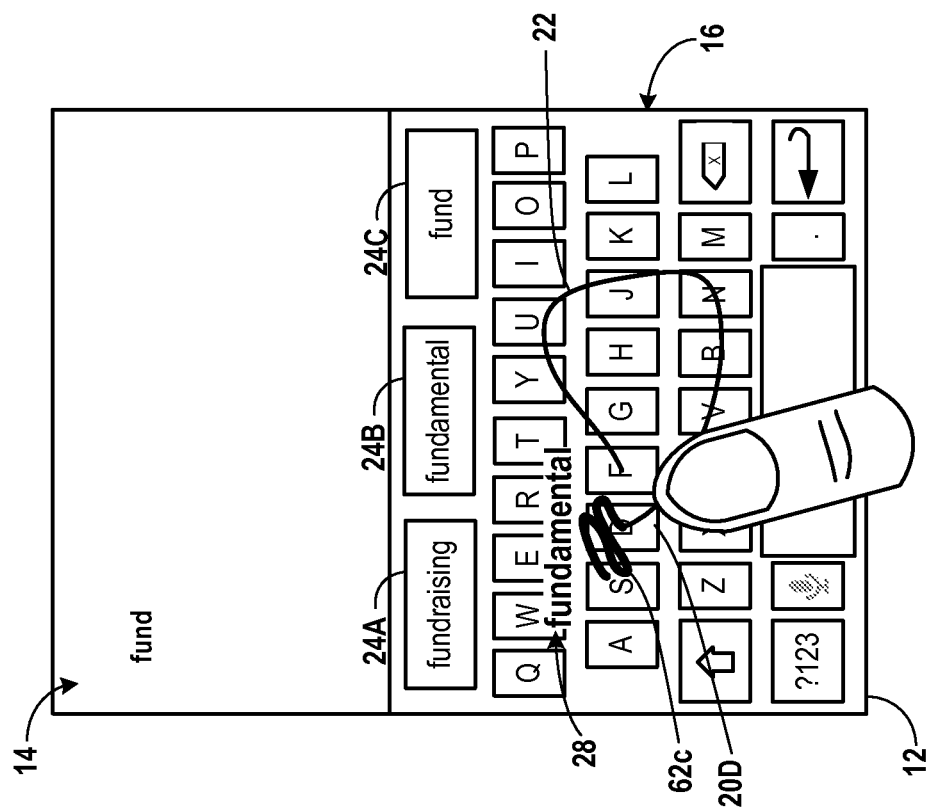

Gesture module 8 may output gesture completion paths in other shapes or visual formats. FIG. 3C is a GUI 12 that illustrates another example gesture completion path 62c, in accordance with one or more aspects of the disclosure. Gesture completion path 62c includes a scribble shape extending from "D" key 20D (the most recently indicated key). Similar to gesture completion path 62b shown in FIG. 3B, gesture completion path 62c may have different scribble shapes and/or a different size in other examples. For example, gesture module 8 may output gesture completion path 62c to UI module 6 to overlay a larger portion of graphical keyboard 16 or may output gesture completion path 62c with a different scribble-like shape.

Also similar to FIG. 3B, in some examples, the user need not precisely trace gesture completion path 62c to indicate candidate word "fundamental" 28. For example, gesture module 8 may be configured to interpret indications received from UI device 4 (e.g., from UI device 4 via UI module 6) that the user has performed a scribble (of any size or shape approximating gesture completion path 62c) extending from "D" key 20D or centered on "D" key 20D as a gesture substantially traversing gesture completion path 6. This may allow the user to perform a less precise (and, potentially, quicker) gesture to substantially traverse gesture completion path 62c and indicate candidate word "fundamental" 28.

In other examples, gesture module 8 can output to UI module 6 a gesture completion path that indicates a discrete gesture, such as a tap, instead of a continuous gesture. FIG. 3D is a GUI 12 that illustrates another example gesture completion path 62d. Gesture completion path 62d includes a circle approximately centered on the most recently indicated key ("D" key 20D in FIG. 3D). Gesture completion path 62d indicates that the user can perform a tapping gesture at "D" key 20D to select the candidate word "fundamental" 28. In other examples, instead of a circle approximately centered on "D" key 20D, gesture completion path 62d may include highlighting or other visual emphasis placed at "D" key 20D. In some implementations, gesture completion path 62d may include pulsing or moving visual elements that indicate to the user that the user is to tap "D" key 20D to indicate the candidate word "fundamental" 28.

In some cases, gesture completion path 62d may indicate more than one character key, e.g., gesture completion path 62d may include a plurality of visual indicators, each indicator associated with a respective character key. For example, gesture completion path 62d can include multiple discrete visual indicators, each visual indicator associated with a respective character key for remaining letters in the candidate word. Each of the visual indicators may be, for example, a circle, highlighting, or other visual emphasis placed on or adjacent to the respective character key. In some examples, the visual indicators in gesture completion path 62d can possess differing visual properties, such as a being more opaque for the next letter in the candidate word and less opaque for subsequent letters in the candidate word.

Additionally, as shown in FIGS. 3A-3D, gesture module 8 can output, to UI module 6 for display by UI device 4, the candidate word "fundamental" 28 associated with the gesture completion path (e.g., gesture completion path 62a, 62b, 62c, or 62d) adjacent to the gesture completion path. For example, as shown in FIGS. 3A-3D, gesture module 8 outputs candidate word "fundamental" 28 for display at UI device 4 above, below, to a side, or otherwise near the gesture completion path. By outputting candidate word "fundamental" 28 adjacent to gesture completion path 26, gesture module 8 may increase a likelihood that user 18 perceives candidate word "fundamental" 28 (e.g., compared to candidate words displayed at word suggestion areas 24), as the visual focus of user 18 is likely directed to gesture keyboard 16 near "D" key 20D as user 18 performs the portion of the gesture indicating the "D" key 20D. Although FIG. 3A-3D illustrate candidate words displayed at word suggestion areas 24 in addition to candidate word "fundamental" 28 displayed adjacent to the gesture completion path, in other examples, e.g., as shown in FIGS. 4A and 4B, UI module 6 may not generate word suggestion areas 24 for display.

Gesture module 8 can output any of gesture completion paths 62a, 62b, 62c, and 62d (collectively, "gesture completion paths 62") to UI module 6 for display at UI device 4 as a translucent or opaque graphical element overlaying a portion of graphical keyboard 16. Gesture module 8 may select the opacity of gesture completion paths 62 by balancing the ability of user 18 to perceive gesture completion paths 62 and how much gesture completion paths 62 obscures underlying portions of graphical keyboard 16. In some examples, the opacity of gesture completion paths 62 may be adjustable by the user, e.g., using a settings menu for graphical keyboard 16.

FIGS. 3A-3D illustrates examples in which gesture module 8 outputs visual depictions of both gesture path 22 and gesture completion paths 62 to UI module 6 for display at GUI 12. In some examples, the visual depiction of gesture path 22 may be different than the visual depiction of gesture completion paths 62. For example, the visual depictions may be different colors, opacities, thicknesses, etc. In some implementations, gesture module 8 can output a visual depiction of a portion of gesture path 22 instead of all of gesture path 22. For example, gesture module 8 can output only a more recently indicated portion of gesture path 22 to UI module 6 for display at GUI 12, and can cause a less recent portion of gesture path 22 to not be output to UI module 6 for display at GUI 12, such as by causing the less recent portion of gesture path 22 to appear to fade away. In some instances, gesture module 8 may cause gesture path 22 to appear to fade away when the user pauses performing the gesture that defines gesture path 22. This may clarify the display of graphical keyboard 16, e.g., by removing the visual depiction of gesture path 22 that overlays a portion of graphical keyboard 16. In other examples, gesture module 8 may not output gesture path 22 to UI module 6 for display at GUI 12.

Similarly, in some examples, gesture module 8 may not output gesture completion paths 62 to UI module 6 for display at UI device 4 at all times while the user is performing the gesture that defines gesture path 22. For example, gesture module 8 may not output gesture completion paths 62 to UI module 6 for display at UI device 4 until the user pauses performing the gesture, e.g., at "D" key 20D. In some instances, not outputting gesture completion paths 62 while the user is actively performing the gesture that defines gesture path 22 may prevent the visual depictions of gesture completion paths 62, which overlay a portion of graphical keyboard 16, from obscuring the portion of graphical keyboard 16. For some users, displaying gesture completion paths 62 only when the user pauses performing the gesture defining gesture path 22 may be preferable so the user can better see graphical keyboard 16.

Alternatively, in some examples where gesture module 8 outputs gesture completion paths 62 to UI module 6 for display while the user is performing the gesture that defines gesture path 22, gesture module 8 may cause gesture completion paths 62 and/or candidate word "fundamental" 28 to be visually emphasized when the user pauses performing the gesture that defines gesture path 22. For example, gesture module 8 may output data that causes UI module 6 to highlight, using color, intensity, or apparent motion, gesture completion paths 62 and/or candidate word "fundamental" 28 when the user pauses performing the gesture that defines gesture path 22. This may improve a likelihood that the user perceives gesture completion paths 62 and/or candidate word "fundamental" 28 while the user is pausing performing the gesture that defines gesture path 22.

In some implementations, gesture module 8 may output, to UI device 6 for display at UI device 4, multiple gesture completion paths, each path associated with a respective candidate word. FIGS. 4A and 4B are conceptual diagrams illustrating example GUIs 12 including a graphical keyboard 16 and multiple gesture completion paths, in accordance with one or more techniques of the disclosure. The example GUIs 12 include a graphical keyboard 16 and a text entry field 14. In the examples of FIGS. 4A and 4B, gesture module 8 outputs the gesture completion paths to UI module 6 for display at UI device 4 at a location within the region of graphical keyboard 16 based at least in part on at least one candidate word.

For example, as shown in FIGS. 4A and 4B, gesture module 8 has determined two candidate words "fundamental" 72a and "fundraising" 72b (collectively, "candidate words 72"). Gesture module 8 outputs candidate words "fundamental" 72a and "fundraising" 72b to UI module 6 for display at GUI 12 at positions overlaying graphical keyboard 16. Additionally, gesture module 8 outputs candidate words "fundamental" 72a and "fundraising" 72b to UI module 6 for display at GUI 12 at positions adjacent to first gesture completion path 70a and second gesture completion path 70b (collectively, "gesture completion paths 70"), respectively. Gesture module 8 can associate candidate word "fundamental" 72a with first gesture completion path 70a and associate candidate word "fundraising" 72b with second gesture completion path 70b. In this way, when gesture module 8 receives indications that a user has performed a gesture substantially traversing first gesture completion path 70a, gesture module 8 may select candidate word "fundamental" 72a for entry to text entry field 14. Similarly, when gesture module 8 receives an indication that a user has performed a gesture substantially traversing second gesture completion path 70b, gesture module 8 may select candidate word "fundraising" 72b for entry to text entry field 14.

As shown in FIGS. 4A and 4B, gesture module 8 outputs, to UI module 6 for display at GUI 12, gesture completion paths 70 at locations extending from "D" key 20D (the most recently indicated key). In some examples, as shown in FIG. 4A, each of first gesture completion path 70a and second gesture completion path 70b extend from "D" key 20D in a generally horizontal direction (where the horizontal direction is defined with respect to graphical keyboard 16). First gesture completion path 70a extends in a first direction towards first border 74 of graphical keyboard 16 and second gesture completion path 70b extends in a second direction towards second border 76 of graphical keyboard 16. In some examples, as in FIG. 4A, the first and second directions may be substantially opposite each other. In some examples, gesture module 8 outputting to UI module 6 gesture completion paths 70 in opposing horizontal directions with associated candidate words 72 located above the respective gesture completion paths 70 may provide easily perceivable candidate words 72 and both gesture completion paths 70 while performing a gesture to input text using graphical keyboard 16.

In some instances, in addition to or as an alternative to outputting gesture completion paths 70 as horizontal lines, gesture module 8 may output, to UI module 6 for display at UI device 4, gesture completion paths extending from "D" key 20D in a one or two vertical orientations relative to graphical keyboard 16 (e.g., up and/or down). This may allow gesture module 8 to output one, two, three, or four candidate words 72 and associated gesture completion paths 70.

As shown in FIG. 4B, in some implementations, instead of outputting both gesture completion paths 70 as horizontal lines, gesture module 8 can output, to UI module 6 for display at UI device 4, one or both of gesture completion paths 70 in other orientations. For example, gesture module 8 can output to UI module 6 each of gesture completion paths 70 for display at an orientation extending from "D" key 20D (the most recently indicated of character keys 20) toward the predicted next character key of the respective one of candidate words 72. In the example of FIG. 4B, this results in gesture module 8 outputting first gesture completion path 70a to UI module 6 for display at GUI 12 extending from "D" key 20D toward (and past) "A" key 20E and second gesture completion path 70b to UI module 6 for display at GUI 12 extending from "D" key 20D toward (and past) "R" key 20F. This may leverage the motion that the user is already making, e.g., toward the predicted next letter, to select a respective one of candidate words 72 associated with the respective one of gesture completion paths 70.

In some instances, second gesture completion path 70b or similar gesture completion paths do not extend toward a vertical border of graphical keyboard 16 or UI device 4 (e.g., first border 74 and second border 76). Instead, second gesture completion path 70b extends toward a center of GUI 12 (alternatively, a top of graphical keyboard 16 or a center of UI device 4). In some of these examples, second gesture completion path 70b may extend to a top border 78 of graphical keyboard 16 (e.g., a border between graphical keyboard 16 and text entry field 14 or another adjacent UI element). In other of these examples, second gesture completion path 70b may extend to a bottom border 78 of graphical keyboard 16). Gesture module 8 may determine the direction in which second gesture completion path 70b (and first gesture completion path 70a) extends based at least in part on the most recently indicated character key 20 (e.g., "D" key 20D), a predicted next letter in the candidate word, and/or whether gesture module 8 outputs gesture completion paths 70 along only cardinal directions (e.g., horizontally and/or vertically as described with respect to FIG. 4A).

In some examples, instead of outputting gesture completion paths 70 as straight lines (whether horizontal or otherwise oriented), gesture module 8 can output, to UI module 6 for display at UI device 4, gesture completion paths 70 in other visual formats, e.g., one of the formats shown in FIGS. 3A-3D. In some implementations, gesture module 8 can output to UI module 6 first gesture completion path 70a in a first visual format and second gesture completion path 70b in a second, different visual format. In other implementations, gesture module 8 can output to UI module 6 first gesture completion path 70a and second gesture completion path 70b in similar or substantially the same visual formats. Additionally or alternatively, the opacity, color, size, etc. of first gesture completion path 70a and second gesture completion path 70b may be the same or different.

Figure 5:
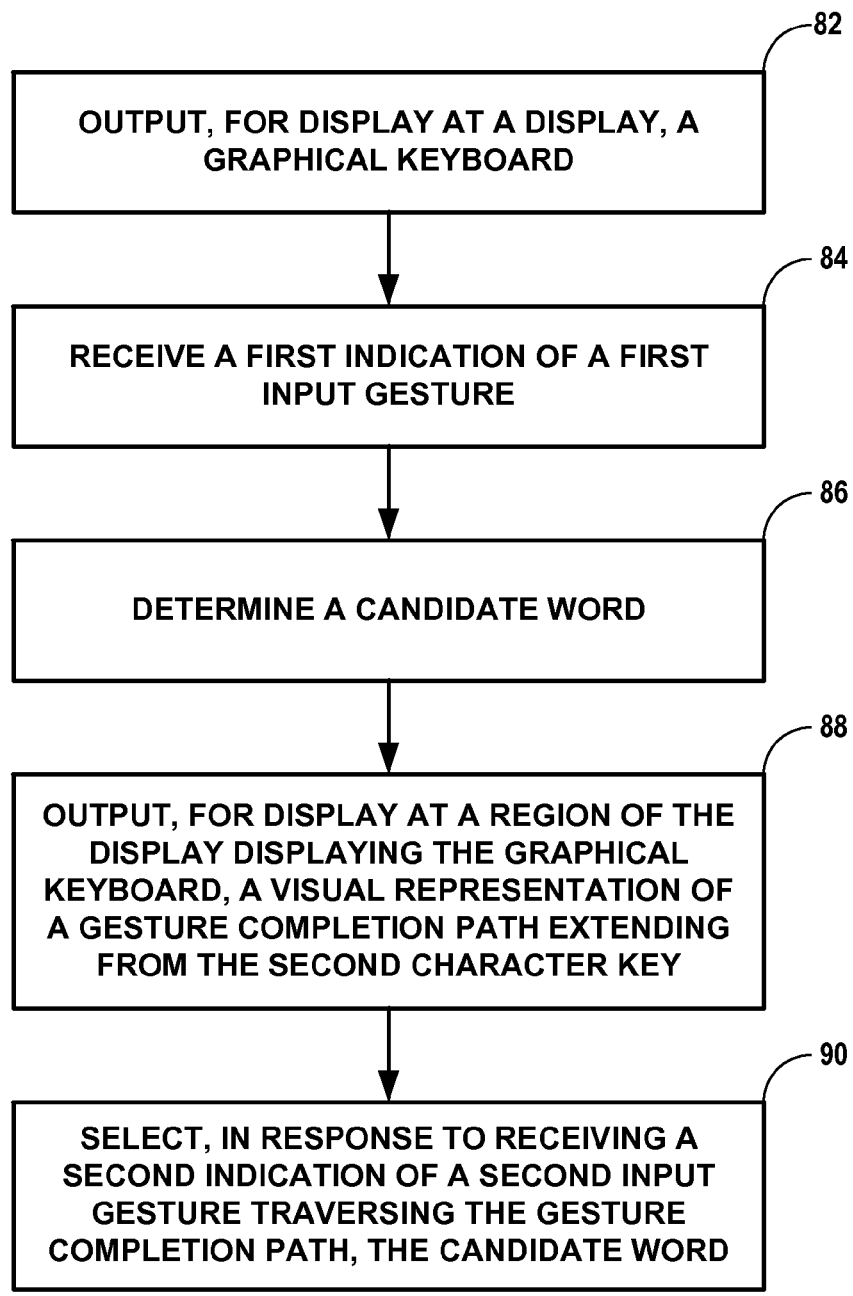
FIG. 5 is a flow diagram illustrating an example technique for displaying a gesture completion path for selecting a candidate word, in accordance with one or more techniques of the present disclosure.

FIG. 5 is a flow diagram illustrating an example technique for displaying a gesture completion path for selecting a candidate word, in accordance with one or more techniques of the present disclosure. The technique of FIG. 5 may be performed by one or more processors of a computing device, such as computing device 2 illustrated in FIG. 1 and FIG. 2. For purposes of illustration, FIG. 5 is described below within the context of computing devices 2 of FIG. 1 and FIG. 2, although the technique of FIG. 5 may be performed by computing devices having configurations different than that of computing device 2.

The technique of FIG. 5 includes outputting, by UI module 6 for display at UI device 4, graphical keyboard 16 (82). In some examples, UI module 6 also can output, for display at UI device 4, text entry field 14 and/or other UI elements. In some instances, as shown in FIG. 1, graphical keyboard 16 can include a plurality of character keys 20 that each are associated with one or more characters. Graphical keyboard 16 can include a QWERTY format, as shown in FIG. 1, or can include a different format, such as Dvorak simplified, etc.

The technique of FIG. 5 also includes, receiving, by gesture module 8, a first indication of a first indication of a first gesture (84). The first indication can include, for example, an indication received by gesture module 8 from UI module 6 and/or UI device 4. The first gesture can include, for example, the gesture indicated by gesture path 22. The first gesture can indicate a first character key of plurality of character keys 20 and a second character key of plurality of character keys 20. In some examples, the first gesture can indicate additional character keys, e.g., at least three character keys of plurality of character keys 20. In some instances, gesture module 8 can determine the character keys 20 indicated by the first gesture using language model 10 and cost values associated with respective ones of plurality of character keys 20, as described with respect to FIG. 1.

Based at least in part on the first and second character keys indicated by the first gesture, gesture module 8 can determine at least one candidate word (86). In some instances, gesture module 8 may determine the at least one candidate word based on the first and second character keys, respective cost values, and language model 10. In some examples, gesture module 8 may determine a single candidate word. In other examples, gesture module 8 may determine a plurality of candidate words.

The technique of FIG. 5 also can include outputting, by gesture module 8 and for display at a region of UI device 4 (e.g., a display) displaying graphical keyboard 16, a gesture completion path 26 extending from the second character key (88). In some examples, gesture module 8 may output gesture completion path 26 to UI module 6 for display at a region of GUI 12 extending from the second character key (e.g., "D" key 20D) toward a next character of the candidate word associated with gesture completion path 26 (e.g., "A" key 20E in FIG. 1). Gesture completion path 26 may include, for example, a straight line, a curved line, a loop, a scribble, etc. In some instances, gesture module 8 can output to UI module 6 the candidate word associated with gesture completion path 26 for display at a region of UI device 4 adjacent to the region of UI device 4 displaying gesture completion path 26, e.g., above, below, or to a side of gesture completion path 26.

The technique can further include, selecting, by gesture module 8 and in response to receiving a second indication of a second input gesture substantially traversing gesture completion path 26, the candidate word (90). In some examples, the second indication may be an indication received by gesture module 8 from UI module 6 and/or UI device 4. The second input gesture can include, for example, a gesture, performed by user 18, that substantially traverses gesture completion path 26. The candidate word can include a candidate word associated with gesture completion path 26, such as candidate word "fundamental" 28 in FIG. 1. Upon selecting the candidate word, gesture module 8 can cause UI module 6 to display the selected candidate word at text entry field 14 of GUI 12.

Because the gesture module 8 outputs the gesture completion path 26 to UI module 6 for display at a portion of the region of UI device 4 at which graphical keyboard 16 is displayed, user 18 may be more likely to perceive gesture completion path 26, and, if gesture completion path 26 is associated with a candidate word that user 18 intends to enter, to substantially traverse gesture completion path 26 to select the candidate word (e.g., compared to displaying a candidate word at a region of the display next to the graphical keyboard). Gesture module 8 may further facilitate perception by outputting gesture completion path 26 for display at a location extending from the character key that gesture module 8 determines to be the most recently indicated character key. This also may allow user 18 to quickly substantially traverse gesture completion path 26, as gesture completion path 26 may be near a location of the US device 4 at which user 18 has the input unit positioned. Additionally, when gesture module 8 is configured to output a candidate word to UI module 6 for display at a region of UI device 4 adjacent to gesture completion path 26, gesture module 8 may increase a likelihood that user 18 of the device will perceive the candidate word. In these ways, gesture completion path 26 may increase an efficiency of text input by user 18.

Figure 6:
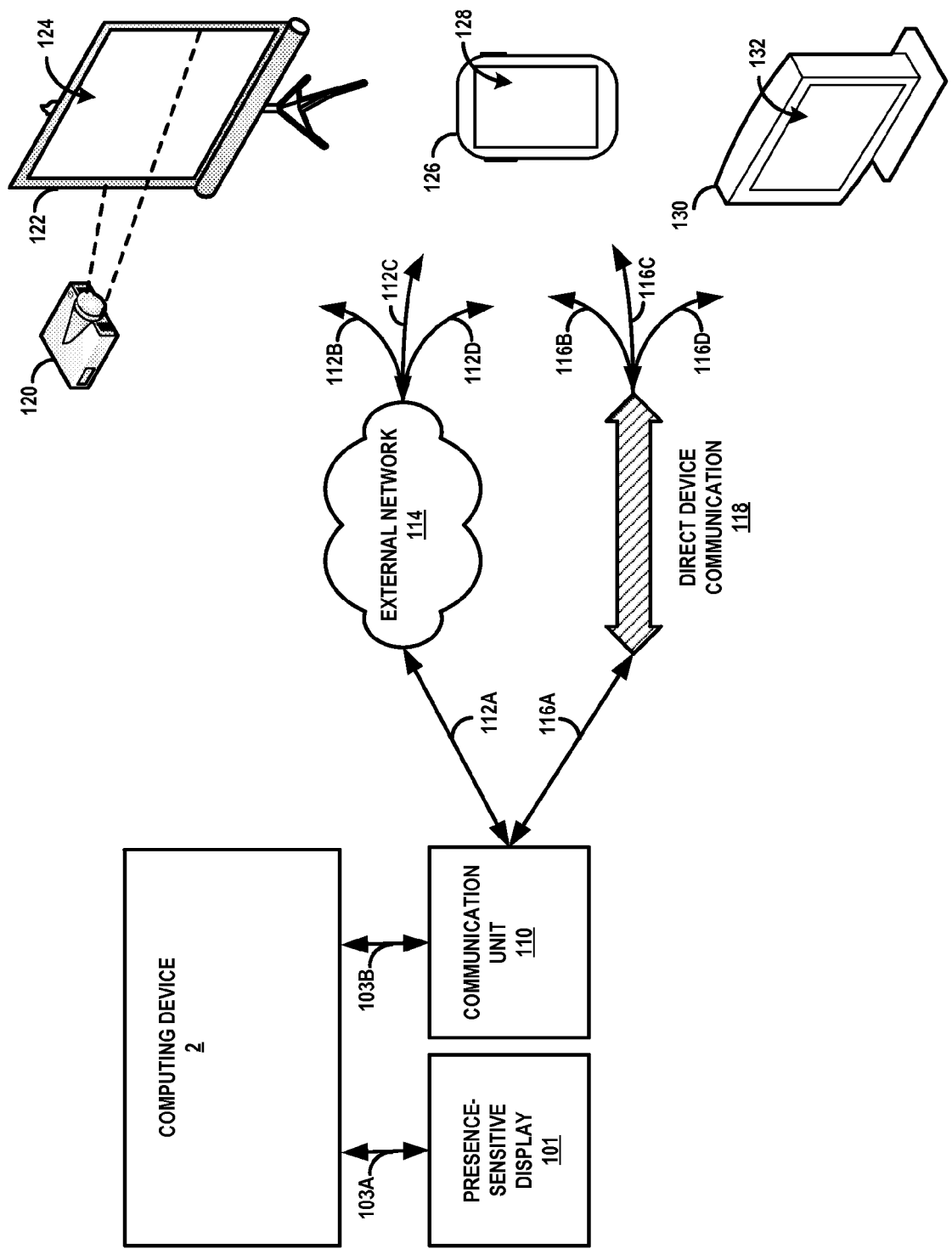
FIG. 6 is a block diagram illustrating an example computing device that outputs graphical content for display at a remote device, in accordance with one or more techniques of the present disclosure.

FIG. 6 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 6 includes a computing device 2, presence-sensitive display 101, communication unit 110, projector 120, projector screen 122, tablet device 126, and visual display device 130. Although shown for purposes of example in FIGS. 1 and 2 as a stand-alone computing device 2, a computing-device may, generally, be any component or system that includes a processor or other suitable computing environment for executing software instructions and, for example, need not include a presence-sensitive display.

As shown in the example of FIG. 6, computing device 2 may be a processor that includes functionality as described with respect to processor 40 in FIG. 2. In such examples, computing device 2 may be operatively coupled to presence-sensitive display 101 by a communication channel 103A, which may be a system bus or other suitable connection. Computing device 2 may also be operatively coupled to I/O devices 110, further described below, by a communication channel 103B, which may also be a system bus or other suitable connection. Although shown separately as an example in FIG. 6, computing device 2 may be operatively coupled to presence-sensitive display 101 and I/O devices 110 by any number of one or more communication channels.

In other examples, such as illustrated previously in FIGS. 1-2, computing device 2 may be a portable or mobile device such as mobile phones (including smart phones), laptop computers, etc. In some examples, computing device 2 may be a desktop computer, tablet computer, smart television platform, camera, personal digital assistant (PDA), server, mainframe, etc.

As shown in FIG. 6, computing device 2 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 2 may also include and/or be operatively coupled with one or more other devices, e.g., input devices, output devices, memory, storage devices, etc. that are not shown in FIG. 6 for purposes of brevity and illustration.

FIG. 6 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 2. In some examples, the one or more communication units may enable communication between projector 120 and projector screen 122. Projector 120 may receive data from computing device 2 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 2.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 2 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 2.

FIG. 6 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 6, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 2 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 2.

As described above, in some examples, computing device 2 may output graphical content for display at presence-sensitive display 101 that is coupled to computing device 2 by a system bus or other suitable communication channel. Computing device 2 may also output graphical content for display at one or more remote devices, such as projector 120, projector screen 122, tablet device 126, and visual display device 130. For instance, computing device 2 may execute one or more instructions to generate and/or modify graphical content in accordance with techniques of the present disclosure. Computing device 2 may output the data that includes the graphical content to a communication unit of computing device 2, such as communication unit 110. Communication unit 110 may send the data to one or more of the remote devices, such as projector 120, projector screen 122, tablet device 126, and/or visual display device 130. In this way, processor 102 may output the graphical content for display at one or more of the remote devices. In some examples, one or more of the remote devices may output the graphical content at a presence-sensitive display that is included in and/or operatively coupled to the respective remote devices.

In some examples, computing device 2 may not output graphical content at presence-sensitive display 101 that is operatively coupled to computing device 2. In other examples, computing device 2 may output graphical content for display at both a presence-sensitive display 101 that is coupled to computing device 2 by communication channel 103A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 2 and output for display at presence-sensitive display 101 may be different than graphical content display output for display at one or more remote devices.

Computing device 2 may send and receive data using any suitable communication techniques. For example, computing device 2 may be operatively coupled to external network 114 using network link 112A. Each of the remote devices illustrated in FIG. 6 may be operatively coupled to network external network 114 by one of respective network links 112B, 112C, and 112D. External network 114 may include network hubs, network switches, network routers, etc., that are operatively inter-coupled thereby providing for the exchange of information between computing device 2 and the remote devices illustrated in FIG. 6. In some examples, network links 112A-112D may be Ethernet, ATM or other network connections. Such connections may be wireless and/or wired connections.

In some examples, computing device 2 may be operatively coupled to one or more of the remote devices included in FIG. 6 using direct device communication 118. Direct device communication 118 may include communications through which computing device 2 sends and receives data directly with a remote device, using wired or wireless communication. That is, in some examples of direct device communication 118, data sent by computing device 2 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in FIG. 6 may be operatively coupled with computing device 2 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 2 may be operatively coupled to visual display device 130 using external network 114. Computing device 2 may output a graphical keyboard for display at presence-sensitive display 132. For instance, computing device 2 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing a gesture at presence-sensitive display 132 to select a group of keys of the keyboard, visual display device 130 may send an indication of the gesture to computing device 2 using external network 114. Communication unit 110 of may receive the indication of the gesture, and send the indication to computing device 2.

Computing device 2 is configured to output, for display at a region of presence-sensitive display 132 at which the gesture keyboard is displayed, a gesture completion path. The gesture completion path is a visual representation of a path for a gesture that, when performed by the user, causes computing device 2 to select a candidate word associated with the gesture completion path. In response to receiving an indication of a gesture that substantially traverses the gesture completion path, computing device 2 can select a candidate word associated with the gesture completion path. This may increase a likelihood that the user will perceive the gesture completion path. Additionally, if the gesture completion path is associated with a candidate word that the user intends to enter, the user may be more likely to substantially traverse the gesture completion path to select the candidate word (e.g., compared to displaying a candidate word at a region of presence-sensitive display 132 next to the graphical keyboard).

In some examples, computing device 2 may also be configured to output a candidate word for display at a region of presence-sensitive display 132 adjacent to the gesture completion path. By outputting the candidate word for display next to the gesture completion path, computing device 2 may increase a likelihood that the user of the device will perceive the candidate word.

Additionally, in some examples, computing device 2 may output the gesture completion path for display at a location extending from the character key that computing device 2 determines to be the most recently indicated character key.

Because computing device 2 outputs the gesture completion path for display at this location (e.g., as opposed to another location of the gesture keyboard or adjacent to the gesture keyboard), the user may be more likely to perceive the gesture completion path. In some examples, the user may be able to more quickly substantially traverse the gesture completion path, as the gesture completion path may be near a location of presence-sensitive display 132 at which the user has the input unit positioned. In these ways, the gesture completion path may increase the efficiency with which the user provides text input to the computing device.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   outputting, by a computing device and for display at a display device, a graphical keyboard comprising a plurality of character keys;
   receiving, at the computing device, an indication of a first input gesture, a first portion of the first input gesture indicating a first character key of the plurality of character keys and a second portion of the first input gesture indicating a second character key of the plurality of character keys;
   determining, by the computing device and based at least in part on the first character key and the second character key, a candidate word;
   outputting, by the computing device and for display at a region of the display device at which the graphical keyboard is displayed, a gesture completion path extending from the second character key, the second character key being the most recently indicated character key, and the gesture completion path being associated with the candidate word; and
   selecting, by the computing device and in response to receiving an indication of a second input gesture that substantially traverses the gesture completion path, the candidate word associated with the gesture completion path.

2. The method of claim 1, further comprising outputting, by the computing device and for display adjacent to the gesture completion path, the candidate word.

3. The method of claim 1, wherein outputting the gesture completion path extending from the second character key comprises outputting the gesture completion path extending from the second character key to a border of the graphical keyboard.

4. The method of claim 1, wherein outputting the gesture completion path extending from the second character key comprises outputting the gesture completion path extending from the second character key to an edge of the display device.

5. The method of claim 1, wherein outputting the gesture completion path extending from the second character key comprises outputting the gesture completion path extending from the second character key toward a center of a third character key corresponding to a third letter of the candidate word.

6. The method of claim 1, wherein outputting the gesture completion path extending from the second character key comprises outputting the gesture completion path extending from the second character key toward an edge of a third character key corresponding to a third letter of the candidate word.

7. The method of claim 1, wherein outputting the gesture completion path extending from the second character key comprises outputting a loop beginning and ending at the second character key.

8. The method of claim 1, further comprising, prior to outputting the gesture completion path extending from the second character key, receiving an indication of a pause in the first gesture at or near the second character key, wherein outputting the gesture completion path extending from the second character key comprises outputting, in response to the indication of the pause in the first gesture, the gesture completion path extending from the second character key.

9. The method of claim 1, wherein determining the candidate word comprises determining a first candidate word, wherein outputting the gesture completion path extending from the second character key comprises outputting a first gesture completion path extending from the second character key, the method further comprising:
   determining, based at least in part on the first character key and the second character key and by the computing device, a second candidate word; and
   outputting, by the computing device and for display at the region of the display device at which the graphical keyboard is displayed, a second gesture completion path extending from the second character key.

10. The method of claim 9, wherein selecting, by the computing device and in response to receiving the indication of the second gesture substantially traversing the gesture completion path, the candidate word comprises selecting, by the computing device and in response to receiving an indication of a third gesture substantially traversing the first gesture completion path, the first candidate word.

11. The method of claim 9, wherein selecting, by the computing device and in response to receiving an indication of a fourth gesture substantially traversing the second gesture completion path, the second candidate word.

12. The method of claim 9, wherein outputting the first gesture completion path extending from the second character key comprises outputting the first gesture completion path extending from the second character key in a first horizontal direction relative to the graphical keyboard, and wherein outputting the second gesture completion path extending from the second character key comprises outputting the second gesture completion path extending from the second character key in a second horizontal direction relative to the graphical keyboard.

13. The method of claim 12, further comprising:
   outputting, by the computing device and for display adjacent to the first gesture completion path, the first candidate word; and
   outputting, by the computing device and for display adjacent to the second gesture completion path, the second candidate word.

14. The method of claim 1, wherein the wherein the graphical keyboard comprises a layout other than a QWERTY layout.

15. The method of claim 1, further comprising outputting, by the computing device and for display at the display device, the first gesture path in a first visual format, wherein outputting the gesture completion path extending from the second character key comprises outputting the gesture completion path extending from the second character key in a second, different visual format.

16. The method of claim 1, further comprising outputting, by the computing device and for display at the region of the display device at which the graphical keyboard is displayed, a gesture path traced by the first input gesture.

17. A computing device comprising:
a display device;
one or more processors;
a user interface module operable by the one or more processors and configured to output, for display at the display device, a graphical keyboard comprising a plurality of character keys; and
a gesture module operable by the one or more processors and configured to:
   receive an indication of a first input gesture, a first portion of the first input gesture indicating a first character key of the plurality of character keys and a second portion of the first input gesture indicating a second character key of the plurality of character keys,
   determine, based at least in part on the first character key and the second character key, a candidate word;
   output, for display by the user interface module at a region of the display device at which the graphical keyboard is displayed, a gesture completion path extending from the second character key, the second character key being the most recently indicated character key, and the gesture completion path being associated with the candidate word,
   output, for display by the user interface module at the region of the display device at which the graphical keyboard is displayed and adjacent to the gesture completion path, the candidate word, and
   select, in response to receiving an indication of a second input gesture substantially traversing the gesture completion path, the candidate word associated with the gesture completion path.

18. The computing device of claim 17, wherein the candidate word comprises a first candidate word, wherein the gesture completion path comprises a first gesture completion path extending from the second character key, and wherein the gesture module is further configured to:
   determine, based at least in part on the first character key and the second character key and by the computing device, a second candidate word; and
   output, for display at the region of the display device at which the graphical keyboard is displayed, a second gesture completion path extending from the second character key.

19. A computer-readable storage medium comprising instructions that, when executed, configure one or more processors of a computing device to:
   output, for display at a display device, a graphical keyboard comprising a plurality of character keys;
   receive an indication of a first input gesture, a first portion of the first input gesture indicating a first character key of the plurality of character keys and a second portion of the first input gesture indicating a second character key of the plurality of character keys;
   determine, based at least in part on the first character key and the second character key, a candidate word;
   output, for display by the user interface module at a region of the display device at which the graphical keyboard is displayed, a gesture completion path extending from the second character key toward a third character key corresponding to a predicted next letter in the candidate word, the second character key being the most recently indicated character key, and the gesture completion path being associated with the candidate word; and
   select, in response to receiving an indication of a second input gesture substantially traversing the gesture completion path, the candidate word associate with the gesture completion path.

20. The computer-readable storage medium of claim 19, wherein the candidate word comprises a first candidate word, wherein the gesture completion path comprises a first gesture completion path extending from the second character key, and further comprising instructions that, when executed, configure the one or more processors to:
- determine, based at least in part on the first character key and the second character key and by the computing device, a second candidate word; and
- output, for display at the region of the display device at which the graphical keyboard is displayed, a second gesture completion path extending from the second character key.

* * * * *